Feb. 21, 1928.
B. BRONSON
1,660,308
RUNNING BOARD OR OTHER TREAD MEMBER
Filed Nov. 17, 1926
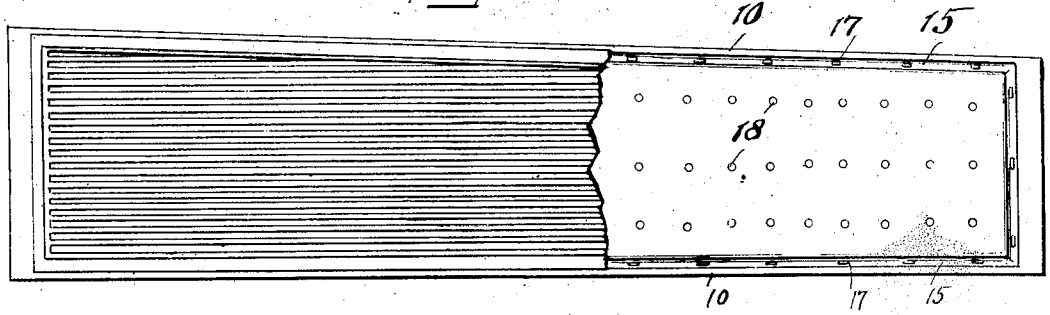
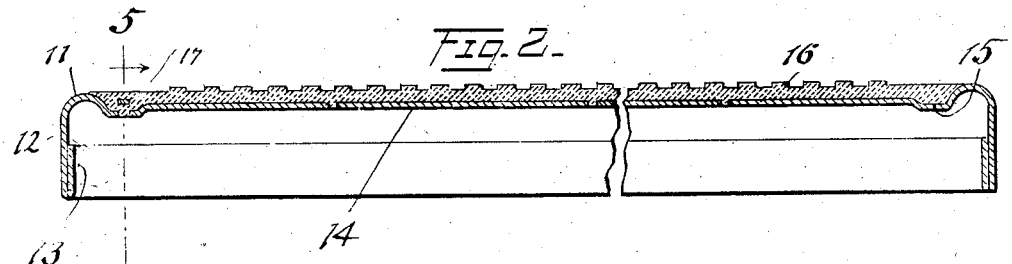
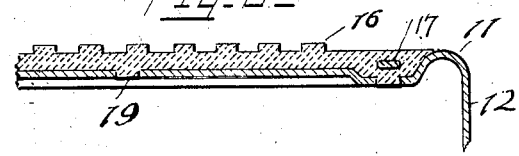
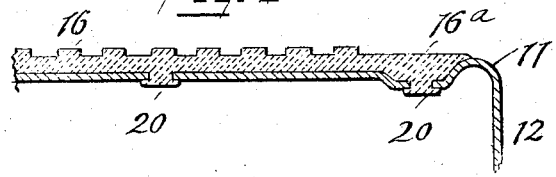
Inventor
Budd Bronson
Kwis Hudson & Kent
Attys.

Patented Feb. 21, 1928.

1,660,308

UNITED STATES PATENT OFFICE.

BUDD BRONSON, OF LAKEWOOD, OHIO, ASSIGNOR TO THE OHIO RUBBER COMPANY, OF CLEVELAND, OHIO, A CORPORATION OF OHIO.

RUNNING BOARD OR OTHER TREAD MEMBER.

Application filed November 17, 1926. Serial No. 148,842.

This invention relates to running boards and other tread members and covers certain modifications in the device constituting the subject matter of my prior application Serial No. 62,981, filed October 17, 1925.

In my prior application there is disclosed a tread member adapted for running boards and other purposes, having a metal body preferably stamped from sheet metal and provided with a marginal upstanding rim forming a shallow depression, the base of which is entirely covered with non-metallic material preferably rubber molded and vulcanized in place and interlocked with the body.

The article disclosed in said application has proved to be very satisfactory, but that constituting the subject matter of the present application embodies certain improvements, particularly in the shape of the metal body and the manner in which the rubber covering is interlocked with the body.

The invention may be briefly summarized as consisting in certain novel details of construction and combinations and arrangements of parts which will be described in the specification and set forth in the appended claims.

In the accompanying sheet of drawings wherein I have shown my invention embodied in a running board for motor vehicles, Fig. 1 is a top plan view of the running board with part of the rubber covering removed; Fig. 2 is a transverse sectional view on a somewhat larger scale; Fig. 3 is a fragmentary transverse sectional view on a still larger scale; Fig. 4 is a similar view showing a modification; and Fig. 5 is a fragmentary longitudinal sectional view substantially along the line 5—5 of Fig. 2, the scale being substantially the same as in Figs. 3 and 4.

The tread member whether used for a running board or other purpose includes a metal body 10, preferably stamped from sheet metal, and provided with a marginal upstanding rim or bead 11 extending all around it, the outer part of the bead terminating in a downturned flange 12 the lower portion of which is preferably bent inward to form a second flange 13 for strengthening purposes.

Within the marginal bead 11 there is a shallow depression having a flat base 14, but inwardly of the bead there is a groove 15 which extends entirely around the metal body just inside the bead.

The depression inside the bead is filled with a sheet 16 of non-metallic material consisting preferably of a sheet of rubber molded and vulcanized to the metal body and also inter-locked therewith. The top of this sheet or layer of rubber may be smooth or may have any suitable configuration, but it is preferably ribbed with the ribs extending lengthwise of the running board. It is to be noted that by reason of the groove 15 in the metal base, the rubber has a thickened margin.

The surface of the rubber where it joins the bead may be slightly below the top of the bead, as in my prior application referred to; it may be substantially flush with the top of the bead, as illustrated in Fig. 2; or it may be slightly above the same, as indicated in Fig. 4, where the rubber covering is designated 16ª.

As stated above, the sheet of rubber 16 is inter-locked with the metal base. This interlocking can be accomplished in various ways, as by forming openings in the base of the sheet metal body so that the rubber will fill these openings, this being particularly effective as an interlock if the rubber lugs filling the openings are given expanded or rivet heads on the lower surface of the sheet metal body; or it can be accomplished by striking up locking portions such as loops or straps from the base of the sheet metal body so that they will be embedded in the rubber; or both the perforations and the straps may be employed. Regardless of the method of interlocking utilized, it is the feature of the invention that the rubber is interlocked with the metal base at its thickened margin as well as at intervals inside the margin. In this connection, I might point out that there is a two-fold advantage obtained by providing the groove in the metal body just inside the rim and of having the rubber fill this groove, for, in the first place, the groove gives added strength to the metal body and it provides an extra thickness of rubber all around its margin, thus providing the most effective holding action where it is most needed, namely, around the margin of the rubber.

In the embodiment illustrated in Figs. 1, 2, 3 and 5, metal straps 17 are struck up from the base of the groove 15, preferably at intervals all around the groove. These straps, which, in the embodiment shown, extend lengthwise of the groove and are best illustrated in Fig. 5, are thus embedded in the thickened marginal portion of the rubber. Additionally, the flat base 14 is provided at intervals with perforations 18, and these are filled with locking lugs 19 of the rubber which in the molding operation fills these openings as well as the spaces beneath the straps 17, and the openings in the metal formed by punching up the straps.

Instead of the straps 17, the base of the groove may be provided with openings similar to the openings 18 in the flat base 14, but in that event the rubber lugs filling the openings are preferably provided with expanded or rivet heads on the under side of the metal, as illustrated in Fig. 4, where the rubber locking lugs are designated 20. Similar rivet heads may be formed on the rubber lugs filling the openings in the construction illustrated in Fig. 3 even though the metal straps 17 are employed.

If the rubber extending through the openings is made flush with the lower surface of the metal, the latter, during the molding and vulcanizing operation, rests upon a flat mold body, but when the rivet heads are to be formed it is only necessary to provide in the mold body suitably shaped depressions in line with the openings in the sheet metal body 10.

It will thus be seen that I have provided a tread member formed of sheet steel and non-metallic tread material, the parts being so formed and united that there is produced what in effect is a unitary structure possessing great strength and durability in the wearing qualities of the tread surface and assurance against this surface being pulled loose notwithstanding rough usage.

While I have illustrated my invention applied to a running board for motor vehicles, I do not desire to limit my invention to the specific disclosure herein.

Having thus described my invention, what I claim is:

1. In an article of the character described, a body of sheet metal having a raised marginal portion forming a shallow depression having a generally flat bottom surface of substantially uniform distance beneath the upper edge of said raised marginal portion, said body having spaced perforations throughout the area of said depression, and a sheet of material molded within said depression and extending through said perforations.

2. In an article of the character described, a body of sheet metal having a raised marginal portion, forming a shallow depression, there being a groove inwardly of the raised marginal portion and adjacent thereto and inwardly of the groove the base of the depression being substantially flat and spaced a substantially uniform distance beneath the raised marginal portion, said body having spaced perforations throughout the area of said depression, and a sheet of material molded within said depression and having integral portions extending through said perforations to interlock with said body.

3. A running board for motor vehicles comprising a body of sheet metal having a raised marginal portion, forming a shallow depression having a substantially flat base and spaced a substantially uniform distance beneath the upper edge of the raised marginal portion, said body having spaced perforations throughout the area of said depression, and a sheet of rubber molded and vulcanized within said depression and having integral portions extending through and expanding beyond said perforations to interlock with said body.

In testimony whereof, I hereunto affix my signature.

BUDD BRONSON.